United States Patent [19]

Abe et al.

[11] Patent Number: 5,459,119
[45] Date of Patent: Oct. 17, 1995

[54] CATALYST FOR PURIFICATION OF EXHAUST GASES

[75] Inventors: Fumio Abe, Handa; Naomi Noda, Ichinomiya; Junichi Suzuki, Kuwana, all of Japan

[73] Assignee: NGK Insulators, Ltd., Japan

[21] Appl. No.: 192,745

[22] Filed: Feb. 7, 1994

[30] Foreign Application Priority Data

Feb. 10, 1993 [JP] Japan .................. 5-022980

[51] Int. Cl.$^6$ .................. B01J 23/40; B01J 23/42; B01J 23/44
[52] U.S. Cl. .................. 502/326; 423/213.5
[58] Field of Search .................. 502/326, 303, 502/304, 333

[56] References Cited

U.S. PATENT DOCUMENTS

| | | | |
|---|---|---|---|
| 4,091,072 | 5/1978 | McArthur | 502/326 |
| 4,152,301 | 5/1979 | Summer et al. | 502/333 |
| 4,153,579 | 5/1979 | Summer et al. | 502/304 |
| 4,492,769 | 1/1985 | Blanchard et al. | 502/326 |
| 4,619,909 | 10/1986 | Ono et al. | 502/303 |
| 4,621,071 | 11/1986 | Blanchard et al. | 502/326 |
| 4,791,091 | 12/1988 | Bricker et al. | 502/303 |
| 4,843,056 | 6/1989 | Matsumoto et al. | 502/303 |
| 4,868,148 | 9/1989 | Herk et al. | 502/303 |
| 4,904,633 | 2/1990 | Ohata et al. | 502/303 |
| 4,931,419 | 6/1990 | Blanchard et al. | 502/303 |
| 4,976,929 | 12/1990 | Cornelisun et al. | 422/174 |

FOREIGN PATENT DOCUMENTS

| | | |
|---|---|---|
| 63-178847 | 7/1988 | Japan . |
| 63-185450 | 8/1988 | Japan . |
| 3-295184 | 12/1991 | Japan . |
| 4-224220 | 8/1992 | Japan . |

*Primary Examiner*—Sharon A. Gibson
*Assistant Examiner*—Patrick J. Neill
*Attorney, Agent, or Firm*—Parkhurst, Wendel & Rossi

[57] ABSTRACT

A catalyst for purification of exhaust gases, comprising a monolithic carrier and a catalyst layer formed thereon for reduction of the carbon monoxide, hydrocarbons and nitrogen oxides emitted from internal combustion engines, wherein (1) the catalyst layer contains catalyst particles each comprising a heat-resistant inorganic oxide and at least one noble metal selected from Pt, Pd and Rh, loaded thereon, (2) the catalyst layer contains, as a whole, three noble metals of Pt, Pd and Rh, (3) the catalyst layer contains, at any position ranging from the outer surface to the midpoint of the thickness, catalyst particles comprising a heat-resistant inorganic oxide and 2–10% by weight, based on the inorganic oxide, of Pd loaded thereon, and (4) the catalyst layer has, at the outer surface, exposed catalyst particles comprising an heat-resistant inorganic oxide and at least Rh loaded thereon.

17 Claims, 2 Drawing Sheets

- ⊘ Rh – CONTAINING CATALYST PARTICLE
- ⊘ Pd – CONTAINING CATALYST PARTICLE
- ⊘ Pt – CONTAINING CATALYST PARTICLE
- ▨ Rh SURFACE COATING LAYER
- ▨ Pd COATING LAYER
- ░ Pt COATING LAYER

MONOLITHIC CARRIER

FIG. 1A

MONOLITHIC CARRIER

FIG. 1B

MONOLITHIC CARRIER

FIG. 1C

MONOLITHIC CARRIER

FIG. 1D

MONOLITHIC CARRIER

CATALYST FOR PURIFICATION OF EXHAUST GASES

BACKGROUND OF THE INVENTION AND THE RELATED ART

The present invention relates to a catalyst for purification of exhaust gases, particularly a catalyst for purification of exhaust gases which is suitably applicable to automobile internal combustion engines.

Various catalysts have been proposed for purification of the nitrogen oxides (NOx), carbon monoxide (CO) and hydrocarbons (HC) present in the exhaust gases emitted from automobile internal combustion engines.

For example, in Japanese Patent Application Kokai (Laid-Open) No. 185450/1988 is disclosed, as a three-way catalyst for use under the severe conditions of high-temperature oxidizing atmosphere, a catalyst for purification of exhaust gases which comprises a honeycomb carrier of one-piece structure and a catalyst composition coated thereon, said catalyst composition containing (a) particles of average particle diameter of 0.5–20 μ comprising a refractory inorganic oxide and 5–30% by weight of Pt loaded thereon and/or (b) particles of average particle diameter of 0.5–20 μ comprising a refractory inorganic oxide and 1–20% by weight of Rh loaded thereon.

Also in Japanese Patent Application Kokai (Laid-Open) No. 178847/1988 is disclosed a catalyst for purification of exhaust gases which comprises a honeycomb carrier of one-piece structure and a catalyst composition coated thereon, said catalyst composition containing (a) particles of average particle diameter of 0.1–20 μ comprising zirconia and 5–30 by weight of Pt and/or Pd loaded thereon and/or (b) particles of average particle diameter of 0.1–20 μ comprising zirconia and 1–20% by weight of Rh loaded thereon.

These catalysts are intended to have improved durabilities by loading noble metal(s) on a small amount of a refractory inorganic oxide (e.g. zirconia or active alumina) at high loading ratio(s), making the resulting material into relatively large particles, and dispersing the particles in a catalyst layer made of, for example, active alumina.

Also in Japanese Patent Application Kokai (Laid-Open) No. 295184/1991 by the present applicant is disclosed, as a catalyst to be loaded on a metallic honeycomb structure, a catalyst obtained by loading, on a $\gamma$-$Al_2O_3$ carrier, 10–100 g/ft$^3$ of Pt and Pd as catalytic substances.

In Japanese Patent Application Kokai (Laid-Open) No. 224220/1992 also by the present applicant, is disclosed, as a catalyst for use in heater, a mixture of Rh—$ZrO_2$ and noble metal(s)-heat-resistant inorganic oxide-rare earth element oxide. In the literature, it is described that the composition comprising a heat-resistant inorganic oxide (e.g. alumina) and a rare earth element oxide (e.g. ceria) has 0.1–10% by weight of noble metal(s) (Pt, Pd or a mixture thereof) loaded thereon.

Each of the above-mentioned catalysts, however, has problem(s). The catalyst described in Japanese Patent Application Kokai (Laid-Open) No. 185450/1988 contains no Pd (Pd is important with respect to the catalyst's low-temperature light-off performance particularly for HC) and is therefore unable to effectively convert HC which is emitted in a large amount at the cold start of an engine and which has posed a problem in recent years.

With respect to the catalyst described in Japanese Patent Application Kokai (Laid-Open) No. 178847/1988, its durability is confirmed only in comparison with the catalysts obtained by impregnating a coating layer of active alumina or zirconia with Pt and Rh, and there is seen substantially no effect brought about by loading noble metals on zirconia at a high concentration although there is seen an anti-alloying effect obtained by arranging different noble metals so as to avoid mutual contact. While it is important that the durability improvement of catalyst be made in a state that noble metal(s) is loaded on a carrier in relatively high dispersion, the above literature makes no mention on this point. Further, loading of Pt and/or Pd on zirconia provides no significant improvement in durability and the use of expensive zirconia has no meaning.

The catalyst disclosed in Japanese Patent Application Kokai (Laid-Open) No. 295184/1991 is an ordinary oxidation catalyst and its ability for purification of exhaust gases is not strikingly high.

With respect to the catalyst disclosed in Japanese Patent Application Kokai (Laid-Open) No. 224220/1992, only a wide range is given for the amounts of noble metals loaded and no mention is made on what suitable amounts of Pt, Pd and Rh should be contained in what position of the catalyst layer. Therefore, a satisfactory effect is not consistently obtained always.

The present invention has been completed in view of the above-mentioned problems of the prior art. The object of the present invention is to find out the optimum position(s) of noble metal(s) in catalyst layer, the suitable amount(s) of noble metal(s) loaded, etc. and thereby provide a catalyst for purification of exhaust gases which has excellent purification ability and durability and which enables effective utilization of noble metal(s).

SUMMARY OF THE INVENTION

The present invention provides a catalyst for purification of exhaust gases, comprising a monolithic carrier and a catalyst layer formed thereon for reduction of the carbon monoxide, hydrocarbons and nitrogen oxides emitted from automobile internal combustion engines, wherein (1) the catalyst layer contains catalyst particles each comprising a heat-resistant inorganic oxide and at least one noble metal selected from Pt, Pd and Rh, loaded thereon, (2) the catalyst layer contains, as a whole, three noble metals of Pt, Pd and Rh, (3) the catalyst layer contains, at any position ranging from the outer surface to the midpoint of the thickness, catalyst particles comprising a heat-resistant inorganic oxide and 2–10% by weight, based on the inorganic oxide, of Pd loaded thereon, and (4) the catalyst layer has, at the outer surface, exposed catalyst particles comprising an heat-resistant inorganic oxide and at least Rh loaded thereon.

DETAILED DESCRIPTION OF THE INVENTION

As described previously, the first feature of the present catalyst for purification of exhaust gases is that the catalyst layer contains catalyst particles each comprising a heat-resistant inorganic oxide and at least one noble metal selected from Pt, Pd and Rh, loaded thereon.

It is preferable that Rh and Pd, or Rh and Pt do not coexist in any catalyst particle because Rh and Pd, or Rh and Pt alloy easily and thereby the properties of Rh are impaired. Pt and Pd may coexist in catalyst particles.

In order to prepare a catalyst layer containing catalyst particles comprising noble metal(s), such catalyst particles may be dispersed in a carrier such as active alumina or the like. However, it is preferable that the catalyst layer consist of said catalyst particles themselves, in view of the catalytic activity. For example, in a preferable case, Pt, Pd and Rh are independently loaded on a heat-resistant inorganic oxide to prepare three kinds of catalyst particles and a catalyst layer is formed only with these three kinds of catalyst particles.

The second feature of the present catalyst for purification of exhaust gases is that the catalyst layer contains, as a whole, three noble metals of Pt, Pd and Rh.

"The catalyst layer contains, as a whole, three noble metals of Pt, Pd and Rh" means that when the section of the catalyst layer formed on a monolithic carrier is observed, each of Pt, Pd and Rh exists at any portion of the thickness direction of the catalyst layer.

Rh acts only mainly for selective removal of NOx; Pt acts mainly for enhancement of high-temperature steady-state operation activity; and Pd acts mainly for low-temperature light-off performance. A synergistic effect of these three components provides a desired catalytic activity. No desired catalytic activity is obtained when any of these three components is absent.

The third feature of the present catalyst for purification of exhaust gases is that the catalyst layer contains, at any position ranging from the outer surface to the midpoint of the thickness, catalyst particles comprising a heat-resistant inorganic oxide and 2–10% by weight, based on the inorganic oxide, of Pd loaded thereon.

By providing a relatively high concentration of Pd in the catalyst layer at a position near the outer surface of the catalyst layer, the resulting catalyst can have remarkably improved light-off performance. That is, CO and HC diffuse from the catalyst surface toward its inside and reach the Pd-containing catalyst particles present near the catalyst surface; at this time, Pd acts as a trigger for purification of CO and HC. If the catalyst particles comprising 2–10% by weight of Pd are present at a position of the catalyst layer ranging from the midpoint of the thickness to the interface between the catalyst layer and the monolithic carrier, substantially no improvement in light-off performance and durability is seen.

In order to obtain the maximum improvement in low-temperature light-off performance, it is considered to provide Pd-containing catalyst particles at the outermost layer of the catalyst layer. However, it should be avoided in view of the catalyst durability because Pd is easily poisoned by lead (Pb) or sulfur oxides (SOx).

Formation of a Pd-containing layer consisting only of catalyst particles comprising a heat-resistant inorganic oxide and 2–10% by weight, based on the inorganic oxide, of Pd loaded thereon, at any position of the catalyst layer ranging from the outer surface to the midpoint of the thickness, is preferable because it can prevent contact between Pd and Rh and can provide an improved catalyst durability.

Formation of the above Pd-containing layer inside a Rh surface coating layer or a Pd—Rh surface coating layer (these two layers are described later), is one of the most preferable embodiments.

The reason why the amount of Pd loaded is 2–10% by weight based on the heat-resistant inorganic oxide, is because when the amount is less than 2% by weight, no improvement in low-temperature light-off performance is obtained and, when the amount is more than 10% by weight, the improvement in low-temperature light-off performance levels off and only invites an increase in noble metal cost. Incidentally, 2–7% by weight is preferable in view of catalyst cost and 2.5–5% by weight is preferable in view of catalyst durability. In these ranges, Pd is appropriately dispersed and can provide improved low-temperature light-off performance.

The fourth feature of the present catalyst for purification of exhaust gases is that the catalyst layer has, at the outer surface, exposed catalyst particles comprising a heat-resistant inorganic oxide and at least Rh loaded thereon.

In this structure, expensive Rh acts effectively and the catalyst has improved durability. The catalyst layer may have, at the outer surface, not only exposed catalyst particles containing Rh but also exposed catalyst particles containing Rh and Pt and/or Pd; however, the former case (only the catalyst particles containing Rh are exposed at the outer surface, that is, a Rh surface coating layer is formed) is preferable in view of the durability of catalyst.

Formation of a Rh—Pd surface coating layer consisting of a mixture of Rh-containing catalyst particles and Pd-containing catalyst particles (the latter particles are preferably catalyst particles comprising a heat-resistant inorganic oxide and 2–10% by weight, based on the inorganic oxide, of Pd loaded thereon), is also a preferable embodiment of the present catalyst because it can provide relatively good catalyst durability and improved low-temperature light-off performance.

In the present invention, the catalyst layer preferably has a thickness of 30–100 μm. A thickness smaller than 30 μm gives no sufficient durability. Meanwhile, a thickness larger than 100 μm is not preferable, either, because it causes increased pressure loss and moreover allows the position of the catalyst particles comprising a heat-resistant inorganic oxide and 2–10% by weight, based on the inorganic oxide, of Pd loaded thereon, to be fairly distant from the outer surface of the catalyst layer. The position of said catalyst particles is preferably 30 μm or less, more preferably 15 μm or less from the outer surface because improved low-temperature light-off performance can be obtained.

When a Rh surface coating layer, a Rh—Pd surface coating layer or Pd coating layer is formed, the layer preferably has a small thickness of 15 μm or less. The thickness of the surface coating layer is most preferably 5–10 μm. With such a thin layer, Rh and Pd can exhibit their effects at the highest degrees because the catalytic reactions take place in the vicinity of the outer surface. The Rh—Pd surface coating layer, even when having a wider thickness range of 2–30 μm, can act satisfactorily when the Pd-containing catalyst particles constituting said coating layer contains Pd in an amount of 2–10% by weight based on the heat-resistant inorganic oxide also contained in said particles, because the catalyst particles comprising a heat-resistant inorganic oxide and 2–10% by weight, based on the inorganic oxide, of Pd loaded thereon, exist at least in the vicinity of said coating layer, i.e. at a distance of 15 μm or less from said coating layer. Thus, by appropriately providing Rh and Pd in the vicinity of the catalyst layer surface, Rh and Pd can exhibit their effects at the highest degrees.

As the heat-resistant inorganic oxide on which noble metal(s) is (are) loaded, there can be used active alumina, zirconia, silica, titania, zeolite, etc. Of these, active alumina and/or zirconia is preferred in view of the interaction with the noble metal(s).

When an active alumina having a specific surface area of 100 $m^2/g$ or more is used, noble metal(s) is (are) loaded thereon in a high dispersion state, whereby preferable catalytic activity is expressed. Zirconia, when used in combination with Rh, provides improved heat resistance particularly in an oxidizing atmosphere.

To the heat-resistant inorganic oxide is ordinarily added a rare earth element oxide, a compound oxide of rare earth element oxides or a compound oxide of a rare earth element oxide and zirconia.

As the rare earth element oxide to be added to the heat-resistant inorganic oxide, there can be suitably used $CeO_2$, $La_2O_3$, a compound oxide thereof, etc. The addition of such a rare earth element oxide provides a catalyst of higher oxygen storage capacity (OSC) and [wider three-way catalytic performance.

The addition of a rare earth element oxide to a heat-resistant inorganic oxide, for example, the addition of $CeO_2$ to active alumina may be conducted by adding a $CeO_2$ powder to active alumina. However, it can be conducted particularly preferably by impregnating active alumina with a cerium compound, calcining the impregnated alumina to form an active alumina-ceria compound oxide, and adding thereto a $CeO_2$ powder as necessary, because this practice can improve the heat resistance of active alumina and the OSC of ceria.

No addition of $CeO_2$ to a heat-resistant inorganic oxide is preferably made when Rh is loaded on the inorganic oxide, because the properties of Rh are impaired in the coexistence of $CeO_2$. With respect to the position at which $CeO_2$ is present in the catalyst layer, $CeO_2$ may be dispersed uniformly in the catalyst layer. $CeO_2$ shows its ability, even though $CeO_2$ is present at a position slightly distant from the outer surface of the catalyst layer. For example, when a Rh surface coating layer is formed, $CeO_2$ is not contained in said layer for the above reason and is allowed to be present below (more inside than) said layer.

The amount of the rare earth element oxide, the compound oxide of rare earth element oxides or the compound oxide of a rare earth element oxide and zirconia, to be added to the heat-resistant inorganic oxide is 2–30% by weight based on the heat-resistant inorganic oxide.

With respect to the amounts loaded of noble metals other than Pd, Rh is loaded on the heat-resistant inorganic oxide in an amount of preferably 0.2–2.5% by weight based on the inorganic oxide and Pt is loaded in an amount of preferably 0.2–2.5% by weight based on the inorganic oxide. When the amounts of Rh and Pt loaded are each less than 0.2% by weight, it is impossible to obtain desired catalytic activities and, when the amounts are each more than 2.5% by weight, Rh and Pt are each loaded in a poor dispersion state. The most preferable amounts of Rh and Pt loaded are each 0.3–1.0% by weight. The amount of each noble metal loaded, when a rare earth element oxide is added to the heat-resistant inorganic oxide, is expressed as % by weight based on the total of the heat-resistant inorganic oxide and the rare earth element oxide.

The amount of each noble metal loaded per unit volume of monolithic carrier is as follows. Rh is loaded in an amount of 2.5–15 g per $ft^3$ of monolithic carrier, preferably 5–10 $g/ft^3$; Pd is loaded in an amount of 10–100 $g/ft^3$, preferably 20–50 $g/ft^3$; and Pt is loaded in an amount of 10–100 $g/ft^3$, preferably 25–80 $g/ft^3$.

With respect to the weight ratio of noble metals loaded, the proportions of Pt and Pd are each 1–20, preferably 2.5–10 when the proportion of Rh is taken as 1.

The total amount of noble metals loaded is 30–150 $g/ft^3$, preferably 45–100 $g/ft^3$.

Next, description is made on the monolithic carrier on which the above-mentioned catalyst layer is formed.

In the present catalyst for purification of exhaust gases, not only the composition and structure of the catalyst layer but also the composition, structure, etc. of the monolithic carrier are important in the actual use of the catalyst.

Preferably, the monolithic carrier used in the present catalyst is made of a heat-resistant inorganic substance and has a honeycomb structure so that it can be used even under severe conditions as seen when employed in, for example, catalytic converters and heaters capable of generating heat when electrified. Use, as the monolithic carrier, of a heater capable of generating heat when electrified (i.e. a honeycomb heater) obtained by attaching at least one electrode to a honeycomb structure made of a heat-resistant inorganic substance capable of generating heat when electrified, is particularly preferable because said heater can bring about the sharp temperature increase of the catalyst and thereby can achieve the exhaust gases purification at cold start at the highest degree.

The monolithic carrier preferably has a honeycomb structure made of cordierite or of metals capable of generating heat when electrified. A metallic honeycomb structure is particularly preferable because it has a high mechanical strength. The metallic honeycomb structure is composed of, for example, stainless steel, Fe—Cr—Al, Fe-Cr, Fe—Al, Fe—Ni, W—Co, Ni—Cr or the like. Fe—Cr—Al, Fe—Cr or Fe—Al is preferable because of the excellent heat resistance, oxidation resistance and corrosion resistance and the low cost.

The honeycomb structure is preferably produced by powder metallurgy and extrusion because the process is simple and gives a low cost. Moreover, the honeycomb structure, being one-piece, gives rise to no telescope phenomenon and can generate heat uniformly.

The honeycomb structure may or may not be porous, but a porous honeycomb structure is preferable because it has high adhesion to the catalyst layer and gives rise to substantially no catalyst peeling caused by difference in thermal expansion between the honeycomb structure and the catalyst layer.

Then, description is made on an example of the production of a metallic honeycomb structure.

First, a material metal powder is prepared using, for example, a Fe powder, an Al powder and a Cr powder, or a powder of an alloy thereof so that they gives a desired composition. The material metal powder is then mixed with an organic binder (e.g. methyl cellulose or polyvinyl alcohol) and water. The resulting mixture is subjected to extrusion to obtain a honeycomb body of desired shape.

The honeycomb body is fired at 1,000°–1,450° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered body (a honeycomb structure) is obtained.

When the firing temperature is lower than 1,000° C., the honeycomb body is not sintered. When the firing temperature is higher than 1,450° C., the sintered body obtained is deformed.

Preferably, the honeycomb structure is coated with a heat-resistant metal oxide (e.g. $Al_2O_3$ or $Cr_2O_3$), on the partition walls and the pore surfaces, because it brings about the improvement in heat resistance, oxidation resistance and corrosion resistance.

Also preferably, the honeycomb structure is provided with a resistance-adjusting means of a desired pattern between the electrodes which are described later.

Preferable examples of the resistance-adjusting means are as follows.

(1) Slits formed in desired directions, positions and lengths.

(2) Partition walls having different lengths in the passage axial direction.

(3) Partition walls of different thicknesses, or passages of different Cell densities.

(4) Slits formed in partition walls.

Of these, the resistance-adjusting means (1) is particularly preferable because the portions of the honeycomb heater to be heated can be selected as desired.

The thus obtained metallic honeycomb structure is provided with electrodes ordinarily-at the circumferential portions of some partition walls or inside, by brazing, welding or the like, to obtain a heater capable of generating heat when electrified (a honeycomb heater).

Incidentally, the electrodes mentioned herein refer to any terminals for applying a voltage to the honeycomb heater.

The heater is preferably formed so as to have a total resistance of 0.001–0.5 Ω.

The shape of honeycomb structure is not particularly restricted. But, as an example, such a specific shape is preferable that the cell density is 6–1,500 cells/in² (cpi²) (0.9–233 cells/cm²) and the partition wall thickness is 50–2,000 μm.

The honeycomb structure may or may not be porous as mentioned above and its porosity is not restricted. However, the porosity is preferably 0–50%, more preferably 5–25% in view of the strength, oxidation resistance, corrosion resistance and adhesion to the catalyst layer.

Incidentally, in the present invention, the honeycomb structure refers to a one-piece structure having a large number of passages formed by partition walls, and the sectional shape (cell shape) of each passage may be any desired one such as circular, polygonal, corrugated or the like.

Next, description is made on the preferable use of the present catalyst for purification of exhaust gases.

The present catalyst for purification of exhaust gases is superior in purification ability at cold start as well as in three-way catalytic activities during steady-state operation. The catalyst shows a strikingly high effect when used by, at the cold start of engine, introducing secondary air or the like into an exhaust gas upstream of the catalyst or controlling the ratio of the amount of air for combustion and the amount of fuel to allow the exhaust gas to have a fuel-lean composition (an oxygen-rich composition).

Automobile engines are usually operated at a fuel-rich side at the cold start. When the exhaust gas is allowed to have, at the cold start, an oxygen-excess composition of $\lambda=0.9–1.5$ by the above-mentioned means, the catalyst particles containing a relatively high amount of Pd, provided near the catalyst surface gives rise to light-off at very low temperatures.

The control of the amount of air for combustion and the amount of fuel can be specifically conducted, for example, by detecting the flow rate of air for combustion by an air flow sensor, controlling a fuel regulator based on said flow rate using a computer, and feeding an amount of fuel smaller than a theoretical amount for a certain period of cold start.

After the warm-up of engine, the exhaust gas is usually allowed to have a composition whose combustible gases and oxygen are in a nearly stoichiometric point, by the use of an oxygen sensor. In such a gas composition, Rh, which is exposed at the catalyst surface, acts favorably and exhibits a high purification ability without being poisoned. When the engine gets hotter and the exhaust gas is produced in an increased amount, the insufficient purification ability of Rh is made up for by particularly Pt component and a high activity is maintained by Rh and Pt. Thus, the amount of Rh in the catalyst can be minimized.

In order for the present catalyst to exhibit the purification ability at cold start at the highest degree, the catalyst is mounted near the exhaust port of the engine. Even in this case, the catalyst shows high durability because the catalyst has Rh exposed at the surface.

For a higher purification ability, the carrier of the present catalyst is preferably a heater capable of generating heat when electrified.

Then, description is made in detail on the structure of the present catalyst for purification of exhaust gases and its preparation, by mentioning various types of catalysts.

(Type A)

First, three kinds of catalyst particles each comprising active alumina and Pt, Pd or Rh loaded thereon are prepared. In the preparation of catalyst particles comprising Pt or Pd, $CeO_2$ is added to active alumina. Then, a slurry containing these three kinds of catalyst particles is prepared and coated on a carrier. The coated carrier is fired to form, on the carrier, a catalyst layer consisting of three kinds of catalyst particles. At that time, the amount of Pd loaded in the Pd-containing catalyst particles is controlled at 2–10% by weight based on the heat-resistant inorganic oxide.

Figure 1A:
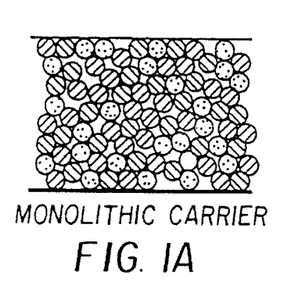
FIG. 1A–1E show fragmentary sectional views of various embodiments of the present catalyst.

The thus-prepared catalyst has a catalyst layer of Rh/Pd/Pt mixed phase as shown in FIG. 1A, wherein part of the Rh-containing catalyst particles is exposed at the surface and the catalyst particles containing a relatively high concentration (2–10% by weight) of Pd are present at least in a portion of the catalyst layer ranging from the surface to the midpoint of the catalyst layer thickness.

The catalyst of this type is easy to prepare and inexpensive. However, since expensive Rh is present also in the inside of the catalyst layer, the catalyst has no optimum purification ability although the purification ability is higher than those of conventional catalysts.

In the catalyst of this type, the catalyst layer may take a form in which three kinds of catalyst particles are dispersed in active alumina [this form is obtained by adding, to a slurry containing three kinds of catalyst particles, an appropriate amount (5–50% by weight, based on the catalyst particles,) of active alumina].

The portion of the catalyst layer ranging from the midpoint of the catalyst layer thickness to the interface between the catalyst layer and the carrier, may not be a Rh/Pd/Pt mixed phase and may be, for example, a Pt coating layer consisting of catalyst particles containing only Pt or a layer consisting of two kinds of catalyst particles selected arbitrarily from the above three kinds of catalyst particles. Further in said portion, the amount of Pd loaded in the Pd-containing catalyst particles need not be in the range of 2–10% by weight based on the heat-resistant inorganic oxide.

(Type B)

First, there are prepared two kinds of catalyst particles each comprising active alumina to which $CeO_2$ is added and Pd or Pt loaded thereon. Then, a slurry containing these two kinds of catalyst particles is prepared and coated on a carrier. The coated carrier is fired to form, on the carrier, a first catalyst layer consisting of two kinds of catalyst particles, i.e. Pd-containing catalyst particles and Pt-containing catalyst particles. At that time, the amount of Pd loaded in the Pd-containing catalyst particles is controlled at 2–10% by weight based on the heat-resistant inorganic oxide.

On the first catalyst layer is formed, as a second catalyst layer, a Rh surface coating layer consisting of Rh-containing catalyst particles. The thickness of the Rh surface coating layer is controlled at about 2–15 μm and the thickness of the first catalyst layer is controlled at 15 μm or more, preferably at about 1.5–15 times the thickness of the Rh surface coating layer.

Figure 1B:
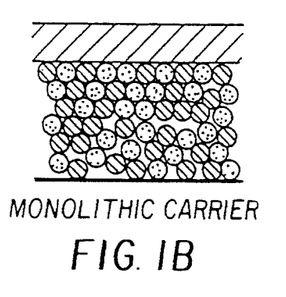

The thus-prepared catalyst has, as shown in FIG. 1B, a two-layered catalyst layer consisting of a first catalyst layer of Pd/Pt mixed phase and a second catalyst layer which is a Rh surface coating layer, wherein only the Rh-containing catalyst particles are exposed at the surface and the catalyst particles containing a relatively high concentration (2–10% by weight) of Pd are present at least in a portion of the catalyst layer ranging from beneath the Rh surface coating layer to the midpoint of the catalyst layer thickness.

The catalyst of this type, having a Rh surface coating layer, has improved durability.

In the catalyst of this type, the first catalyst layer may be a Rh/Pd/Pt mixed phase. Further in the portion of the catalyst layer ranging from the midpoint of the catalyst layer thickness to the interface between the catalyst layer and the carrier, the kinds of noble metals and their amounts are not particularly restricted. The presence of catalyst particles containing expensive Rh and catalyst particles containing a large amount of Pd in said portion of the catalyst layer, gives no noticeable improvement in catalytic activity and only invites an increase in cost of noble metals; therefore, in said portion, there are preferably used either catalyst particles containing a relatively small amount of Pt or Pd, or said two different catalyst particles.

(Type C)

First, three kinds of catalyst particles each containing Pt, Pd or Rh are prepared in the same manner as in the case of Type A. Then, three kinds of slurries each containing one of said three kinds of catalyst particles are prepared and coated on a carrier to form, on the carrier, a Pt coating layer as a first catalyst layer, a Pd coating layer as a second coating layer and a Rh surface coating layer as a third coating layer. At that time, the amount of Pd loaded in the Pd-containing catalyst particles is controlled at 2–10% by weight based on the heat-resistant inorganic oxide. The thicknesses of the Rh surface coating layer and the Pd coating layer are each controlled at about 2–15 μm and the thickness of the Pt coating layer is controlled at 15 μm or more. The Pd coating layer is provided so that at least the part, preferably the whole part is in a portion of the catalyst layer ranging from beneath the Rh surface coating layer to the midpoint of the catalyst layer thickness.

Figure 1C:
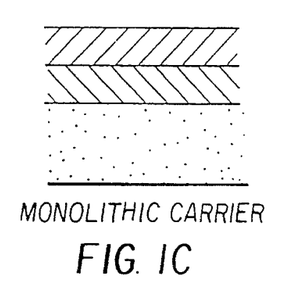

The thus-prepared catalyst has, as shown in FIG. 1C, a three-layered catalyst layer consisting of a first catalyst layer (a Pt coating layer), a second catalyst layer (a Pd coating layer) and a third catalyst layer (a Rh surface coating layer), wherein only the Rh-containing catalyst particles are exposed at the surface and at least the part, preferably the whole part of the catalyst particles containing a relatively high concentration (2–10% by weight) of Pd is in a portion of the catalyst layer ranging from beneath the Rh surface coating layer to the midpoint of the catalyst layer thickness.

The catalyst of this type has improved durability because only the Rh-containing catalyst particles are exposed at the surface, and moreover has improved low-temperature light-off performance because the Pd coating layer is present in the vicinity of the surface.

In the catalyst of this type, the first catalyst layer may be a mixed phase containing Pd-containing catalyst particles and/or Rh-containing catalyst particles in addition to Pt-containing catalyst particles, or may have a multi-layered structure containing a Pt-containing layer. That is, the first coating layer must contain Pt and the inclusion of Pd and/or Rh therein is optional.

(Type D)

First, three kinds of catalyst particles each containing Pt, Pd or Rh are prepared in the same manner as in the case of Type A. Using these three kinds of catalyst particles, there are prepared three kinds of slurries, i.e. a slurry containing Pt-containing catalyst particles, a slurry containing Pd-containing catalyst particles, and a slurry containing Rh-containing catalyst particles and Pt-containing catalyst particles. These three kinds of slurries are coated on a carrier to form, on the carrier, a Pt coating layer as a first catalyst layer, a Pd coating layer as a second catalyst layer and a Rh—Pt surface coating layer as a third catalyst layer. At that time, the amount of Pd loaded in the Pd coating layer is controlled at 2–10% by weight based on the heat-resistant inorganic oxide. The thicknesses of the Rh—Pt surface coating layer and the Pd coating layer are each controlled at about 2–15 μm and the thickness of the Pt coating layer is controlled at 15 μm or more. The Pd coating layer is provided so that at least the part, preferably the whole part is in a portion of the catalyst layer ranging from beneath the Rh—Pt surface coating layer to the midpoint of the catalyst layer thickness.

Figure 1D:
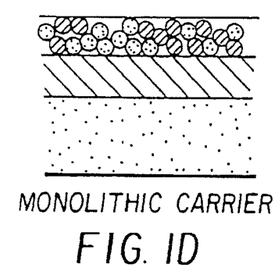

The thus-prepared catalyst has, as shown in FIG. 1D, a three-layered catalyst layer consisting of a first catalyst layer (a Pt coating layer), a second catalyst layer (a Pd coating layer) and a third catalyst layer (a Rh—Pt Surface coating layer), wherein part of the Rh-containing catalyst particles is exposed at the surface and the catalyst particles containing a relatively high concentration (2–10% by weight) of Pd are at least in a portion of the catalyst layer ranging from beneath the Rh—Pt surface coating layer to the midpoint of the catalyst layer thickness.

The catalyst of this type has improved three-way catalytic activities particularly at high temperatures because Pt is contained in the surface coating layer.

In the catalyst of this type, the second catalyst layer may well be a Rh—Pd coating layer consisting of Rh-containing catalyst particles and Pd-containing catalyst particles, and the first catalyst layer may be a coating layer of any composition and structure.

(Type E)

First, three kinds of catalyst particles each containing Pt, Pd or Rh are prepared in the same manner as in the case of Type A. Using these three kinds of catalyst particles, there are prepared two kinds of slurries, i.e. a slurry containing Pt-containing catalyst particles and a slurry containing Rh-containing catalyst particles and Pd-containing catalyst particles. These two kinds of slurries are coated on a carrier to form, on the carrier, a Pt coating layer as a first catalyst layer and, as a second catalyst layer, a Rh—Pd surface coating layer consisting of Rh-containing catalyst particles and Pd-containing catalyst particles. At that time, the amount of Pd loaded in the Pd-containing catalyst particles is controlled at 2–10% by weight based on the heat-resistant inorganic oxide. The thickness of the Rh—Pd surface coating layer is controlled at about 2–30 μm and the thickness of the Pt coating layer is controlled at 15 μm or more.

Figure 1E:
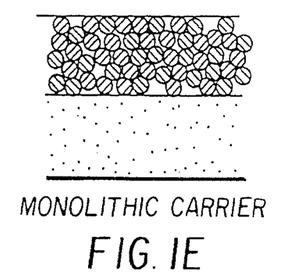

The thus-prepared catalyst has, as shown in FIG. 1E, has a two-layered catalyst layer consisting of a first catalyst layer (a Pt coating layer) and a second catalyst layer (a Rh—Pd surface coating layer), wherein part of the Rh-containing catalyst particles is exposed at the surface and the catalyst particles containing a relatively high concentration (2–10% by weight) of Pd are present at least in a portion of the catalyst layer ranging from the surface to the midpoint of the catalyst layer thickness.

The catalyst of this type is improved particularly in low-temperature light-off performance because part of the catalyst particles containing a relatively high concentration of Pd is exposed at the surface.

In the catalyst of this type, the first catalyst layer may be a mixed phase containing Pd-containing catalyst particles and/or Rh-containing catalyst particles in addition to Pt-containing catalyst particles, or may have a multi-layered structure containing a Pt-containing layer. That is, the first coating layer must contain Pt and the inclusion of Pd and/or Rh therein is optional.

In the above catalysts of types A to E, Rh may be loaded on $ZrO_2$ in place of being loaded on active alumina. Also in the above catalysts, each catalyst particle contains only one noble metal but may contain two or more noble metals in any desired combination. Preferably, however, no catalyst particle contains Rh and Pd together.

The present invention is hereinafter described in more detail by way of Examples. However, the present invention is not restricted to these Examples.

Catalysts were prepared and evaluated according to the following procedures.

[Preparation of noble metal-loaded heat-resistant oxides (catalyst particles)]

(1) Pt-loaded $Al_2O_3$—$CeO_2$ powder

Commercially available γ-$Al_2O_3$ having a BET specific surface area of 200 $m^2/g$ was impregnated with an aqueous cerium nitrate solution so that the amount loaded (in terms of ceria) became 6% by weight. The resulting material was calcined at 600° C. for 3 hours to obtain an alumina-ceria compound oxide. The compound oxide was pulverized by a wet method. Thereto was added a ceria powder in an amount of 20% by weight based on the amount of γ-$Al_2O_3$. There were further added an aqueous dinitrodiammineplatinum solution and acetic acid. The mixture was pulverized in a ball mill for 15 hours. The resulting slurry was dried at 100° C. for 15 hours and then fired at 550° C. for 3 hours to obtain a Pt-loaded $Al_2O_3$–$CeO_2$ powder.

(2) Pd-loaded $Al_2O_3$-$CeO_2$ powder

A Pd-loaded $Al_2O_3$—$CeO_2$ powder was obtained in the same manner as in the above (1) except that an aqueous palladium nitrate solution was used in place of the aqueous dinitrodiammineplatinum solution.

(3) Pd-loaded $Al_2O_3$ powder

An aqueous palladium nitrate solution and acetic acid were added to commercially available γ-$Al_2O_3$ having a BET specific surface area of 200 $m^2/g$. The mixture was pulverized in a ball mill for 15 hours to obtain a slurry. The slurry was dried at 100° C. for 15 hours and then fired at 550° C. for 3 hours to obtain a Pd-loaded $Al_2O_3$ powder.

(4) Rh-loaded $Al_2O_3$ powder

A Rh-loaded $Al_2O_3$ powder was obtained in the same manner as in the above (3) except that an aqueous rhodium nitrate solution was used in place of the aqueus palladium nitrate solution.

(5) Rh-loaded $ZrO_2$ powder

A Rh-loaded $ZrO_2$ powder was obtained in the same manner as in the above (4) except that a commercially available partially stabilized $ZrO_2$ powder (containing 3 mole % of $Y_2O_3$ and having a BET specific surface area of 16 $m^2/g$) was used in place of γ-$Al_2O_3$.

[Preparation of catalysts]

The noble metal-loaded heat-resistant oxides (catalyst particles) obtained in the above (1) to (5) were mixed, singly or in combination, with appropriate amounts of acetic acid and water. Each mixture was pulverized in a ball mill for 15 hours to prepare slurries for a first catalyst layer. A monolithic carrier was dipped one time or plural times in one of the slurries. Then, each carrier was subjected to a drying step and a firing step to form the first catalyst layer on the carrier. Further, when a second catalyst layer or a third catalyst layer is formed, the slurries for the second catalyst layer or the third catalyst layer are prepared in the same manner as in the above first catalyst layer. Then each carrier was subjected to the same steps as in the formation of the first catalyst layer to finally obtain catalysts of the previously mentioned types A–E, of Examples 1–11 according to the present invention and catalysts of Comparative Examples 1–4 which were not within the scope of the present invention. In the catalysts of Comparative Examples 1–2, the amount of Pd loaded was not in the range of 2–10% by weight; in the catalyst of Comparative Example 3, the catalyst composition was the same as in the catalyst of Example 5 but the Rh-containing catalyst particles were not exposed at the surface; and in the catalyst of Comparative Example 4, the catalyst composition was the same as in the catalyst of Example 5 but the catalyst particles containing a high concentration of Pd were not in the vicinity of the surface. The amount of each noble metal loaded (% by weight based on heat-resistant oxide), the total amount of noble metals loaded, the amount of washcoat, etc. in each catalyst are shown in Table 1 (Examples) and in Table 2 (Comparative Examples). Incidentally, the monolithic carrier used was a cordierite honeycomb (outside diameter =1 inch; length =2 inches; rib thickness =6 mil; cell density =400 $cpi^2$) manufactured by NGK INSULATORS, LTD.

TABLE 1

| Example | Catalyst type | Amount of noble metal loaded (%) | | | | |
|---|---|---|---|---|---|---|
| | | Rh—$Al_2O_3$ | Rh—$ZrO_2$ | Pd—$Al_2O_3.CeO_2$ | Pd—$Al_2O_3$ | Pt—$Al_2O_3.CeO_2$ |
| 1 | A | 0.42 | | 5.0 | | 0.69 |
| 2 | B | 0.42 | | 5.0 | | 0.69 |
| 3 | C | 0.42 | | 2.0 | | 0.69 |
| 4 | C | 0.42 | | 2.0 | | 0.69 |
| 5 | C | 0.42 | | 5.0 | | 0.69 |
| 6 | C | 0.42 | | 10.0 | | 0.69 |
| 7 | C | 0.42 | | 10.0 | | 0.69 |
| 8 | D | 0.42 | | 5.0 | | 0.7 |
| 9 | E | 0.42 | | 5.0 | | 0.7 |

TABLE 1-continued

| | | | | | | |
|---|---|---|---|---|---|---|
| 10 | E | | 0.42 | 5.0 | | 0.7 |
| 11 | E | 0.42 | | | 5.0 | 0.7 |

| Example | Catalyst structure | Amount of wash coat (g/cc) | Each layer thickness (μm) | Total amount of noble metals loaded (g/ft³) | Weight ratio of noble metals Pt/Pd/Rh | Catalyst layer thickness (μm) |
|---|---|---|---|---|---|---|
| 1 | First catalyst layer: Rh/Pd/Pt mixed phase | 0.27 | 68 | 80 | 5/6/1 | 68 |
| 2 | First catalyst layer: Pd/Pt mixed phase | 0.21 | 53 | 80 | 5/6/1 | 68 |
| | Second catalyst layer: Rh surface coating layer | 0.06 | 15 | | | |
| 3 | First catalyst layer: Pt coating layer | 0.18 | 45 | 57 | 5/2.5/1 | 68 |
| | Second catalyst layer: Pd coating layer | 0.05 | 8 | | | |
| | Third catalyst layer: Rh surface coating layer | 0.06 | 15 | | | |
| 4 | First catalyst layer: Pt coating layer | 0.18 | 45 | 80 | 5/6/1 | 79 |
| | Second catalyst layer: Pd coating layer | 0.07 | 19 | | | |
| | Third catalyst layer: Rh surface coating layer | 0.06 | 15 | | | |
| 5 | First catalyst layer: Pt coating layer | 0.18 | 45 | 80 | 5/6/1 | 68 |
| | Second catalyst layer: Pd coating layer | 0.03 | 8 | | | |
| | Third catalyst layer: Rh surface coating layer | 0.06 | 15 | | | |
| 6 | First catalyst layer: Pt coating layer | 0.18 | 45 | 125 | 5/12.7/1 | 68 |
| | Second catalyst layer: Pd coating layer | 0.03 | 8 | | | |
| | Third catalyst layer: Rh surface coating layer | 0.06 | 15 | | | |
| 7 | First catalyst layer: Pt coating layer | 0.18 | 45 | 80 | 5/6/1 | 64 |
| | Second catalyst layer: Pd coating layer | 0.014 | 4 | | | |
| | Third catalyst layer: Rh surface coating layer | 0.06 | 15 | | | |
| 8 | First catalyst layer: Pt coating layer | 0.16 | 41 | 80 | 5/6/1 | 68 |
| | Second catalyst layer: Pd coating layer | 0.03 | 8 | | | |
| | Third catalyst layer: Rh—Pt surface coating layer | 0.08 | 19 | | | |
| 9 | First catalyst layer: Pt coating layer | 0.18 | 45 | 80 | 5/6/1 | 68 |
| | Second catalyst layer: Rh—Pd surface coating layer | 0.09 | 23 | | | |
| 10 | First catalyst layer: Pt coating layer | 0.18 | 45 | 80 | 5/6/1 | 64 |
| | Second catalyst layer: Rh—Pd surface coating layer | 0.09 | 19 | | | |
| 11 | First catalyst layer: Pt coating layer | 0.18 | 45 | 80 | 5/6/1 | 66 |
| | Second catalyst layer: Rh—Pd surface coating layer | 0.09 | 21 | | | |

TABLE 2

| Comparative example | Catalyst type | Amount of noble metal loaded (%) | | | | |
|---|---|---|---|---|---|---|
| | | Rh—Al₂O₃ | Rh—ZrO₂ | Pd—Al₂O₃·CeO₂ | Pd—Al₂O₃ | Pt—Al₂O₃·CeO₂ |
| 1 | C | 0.42 | | 1.5 | | 0.69 |
| 2 | C | 0.42 | | 12.0 | | 0.69 |
| 3 | — | | 0.42 | 5.0 | | 0.69 |
| 4 | — | | 0.42 | 5.0 | | 0.69 |

TABLE 2-continued

| Comparative example | Catalyst structure | Amount of wash coat (g/cc) | Each layer thickness (μm) | Total amount of noble metals loaded (g/ft$^3$) | Weight ratio of noble metals Pt/Pd/Rh | Catalyst layer thickness (μm) |
|---|---|---|---|---|---|---|
| 1 | First catalyst layer: Pt coating layer | 0.18 | 45 | 52.7 | 5/1.9/1 | 68 |
|  | Second catalyst layer: Pd coating layer | 0.03 | 8 |  |  |  |
|  | Third catalyst layer: Rh surface coating layer | 0.06 | 15 |  |  |  |
| 2 | First catalyst layer: Pt coating layer | 0.18 | 45 | 142 | 5/15.2/1 | 68 |
|  | Second catalyst layer: Pd coating layer | 0.03 | 8 |  |  |  |
|  | Third catalyst layer: Rh surface coating layer | 0.06 | 15 |  |  |  |
| 3 | First catalyst layer: Pt coating layer | 0.18 | 45 | 80 | 5/6/1 | 68 |
|  | Second catalyst layer: Rh coating layer | 0.06 | 15 |  |  |  |
|  | Third catalyst layer: Pd surface coating layer | 0.03 | 8 |  |  |  |
| 4 | First catalyst layer: Pd coating layer | 0.03 | 8 | 80 | 5/6/1 | 68 |
|  | Second catalyst layer: Pt coating layer | 0.18 | 45 |  |  |  |
|  | Third catalyst layer: Rh surface coating layer | 0.06 | 15 |  |  |  |

[Evaluation of catalysts]

In order to estimate the long-term durability of each catalyst obtained above, each catalyst was exposed to an exhaust gas of 850° C. emitted from an actual engine and aged for a total of 100 hours with a fuel-cut mode. Each of the resulting catalysts was measured for light-off performance and three-way catalytic performance, using synthetic exhaust gases (simulated engine exhaust gases). The measured light-off performance was expressed as $T_{50}$ for HC (°C.), i.e. a temperature at which the HC component present in a synthetic exhaust gas was converted by 50%. In this case, there were used, as the synthetic exhaust gas, two kinds of gases, one having a composition of nearly stoichiometric air-fuel ratio ($\lambda$=1.0) and the other having a fuel-lean composition ($\lambda$=1.3) obtained by adding 30% of air to the former gas. The measured three-way catalytic performance was expressed as conversions at 400° C. (%) of CO, HC and NOx present present in a synthetic exhaust gas. In this case, the synthetic exhaust gas had a composition of nearly stoichiometric air-fuel ratio ($\lambda$=1.0). The results are shown in Table 4. The compositions, etc. of the synthetic exhaust gases used are shown in Table 3.

TABLE 3

|  | During measurement of light-off performance | | During measurement of three-way catalytic performance |
|---|---|---|---|
|  | $\lambda$ = 1.0 | $\lambda$ = 1.3 | $\lambda$ = 1.0 |
| Composition of synthetic exhaust gas (by volume) | | | |
| $CO_2$ | 13.2% | 10.2% | 13.2% |
| $O_2$ | 0.8% | 5.2% | 1.4% |
| CO | 0.7% | 0.5% | 1.7% |
| $H_2$ | 0.2% | 0.2% | 0.6% |
| HC | 2,800 ppm (in terms of carbon) | 2,200 ppm (in terms of carbon) | 2,700 ppm (in terms of carbon) |
| NO | 1,500 ppm | 1,100 ppm | 900 ppm |
| $SO_2$ | 0 ppm | 0 ppm | 20 ppm |
| $N_2$ | Balance | Balance | Balance |
| SV (Space velocity) | 50,000 hr$^{-1}$ | 65,000 hr$^{-1}$ | 50,000 hr$^{-1}$ |

TABLE 4

|  | Light-off performance T50% for HC (°C.) | | Conversions for three components at 400° C. (%) | | |
|---|---|---|---|---|---|
|  | $\lambda$ = 1.0 | $\lambda$ = 1.3 | CO | HC | NOx |
| Example | | | | | |
| 1 | 278 | 229 | 92 | 93 | 92 |
| 2 | 270 | 221 | 93 | 93 | 98 |
| 3 | 256 | 205 | 97 | 94 | 99 |
| 4 | 252 | 201 | 98 | 95 | 100 |
| 5 | 241 | 189 | 98 | 98 | 100 |
| 6 | 250 | 198 | 97 | 96 | 99 |
| 7 | 244 | 195 | 98 | 96 | 100 |
| 8 | 259 | 212 | 93 | 94 | 96 |
| 9 | 245 | 194 | 98 | 98 | 98 |
| 10 | 244 | 196 | 97 | 98 | 99 |
| 11 | 248 | 197 | 97 | 97 | 98 |
| Comparative example | | | | | |
| 1 | 296 | 245 | 90 | 87 | 94 |
| 2 | 284 | 233 | 92 | 90 | 94 |
| 3 | 252 | 203 | 91 | 94 | 86 |
| 4 | 311 | 269 | 94 | 93 | 95 |

As is clear from Table 4, the catalysts of Examples 1–11 according to the present invention, as compared with those of Comparative Examples 1–4, are well balanced in light-off performance and three-way catalytic performance, are superior in both HC conversion at cold start and conversions of CO, HC and NOx at steady-state operation, and have sufficient durability.

Next, using, as a monolithic carrier, a honeycomb heater capable of generating heat when electrified, catalyst-loaded honeycomb heaters were prepared according to the following procedure and then evaluated.

[Preparation of honeycomb heaters]

A pure Fe powder, a pure Cr powder, a Fe-50 wt. % Al alloy powder a Fe-20 wt. % B powder and a Fe-75 wt. % Si powder were compounded so as to give a composition of Fe—20Cr—5Al—1Si—0.05B (wt. %). Thereto were added an organic binder (methyl cellulose), an antioxidant (oleic acid) and water to prepare a readily formable billet. The billet was subjected to extrusion to obtain a honeycomb comprising square cells. The honeycomb was dried and then fired at 1,350° C. in a $H_2$ atmosphere to obtain honeycomb structures each having an outside diameter of 90 mm, a length of 40 mm, a rib thickness of 4 mil and a cell density of 400 $cpi^2$.

Figure 2:
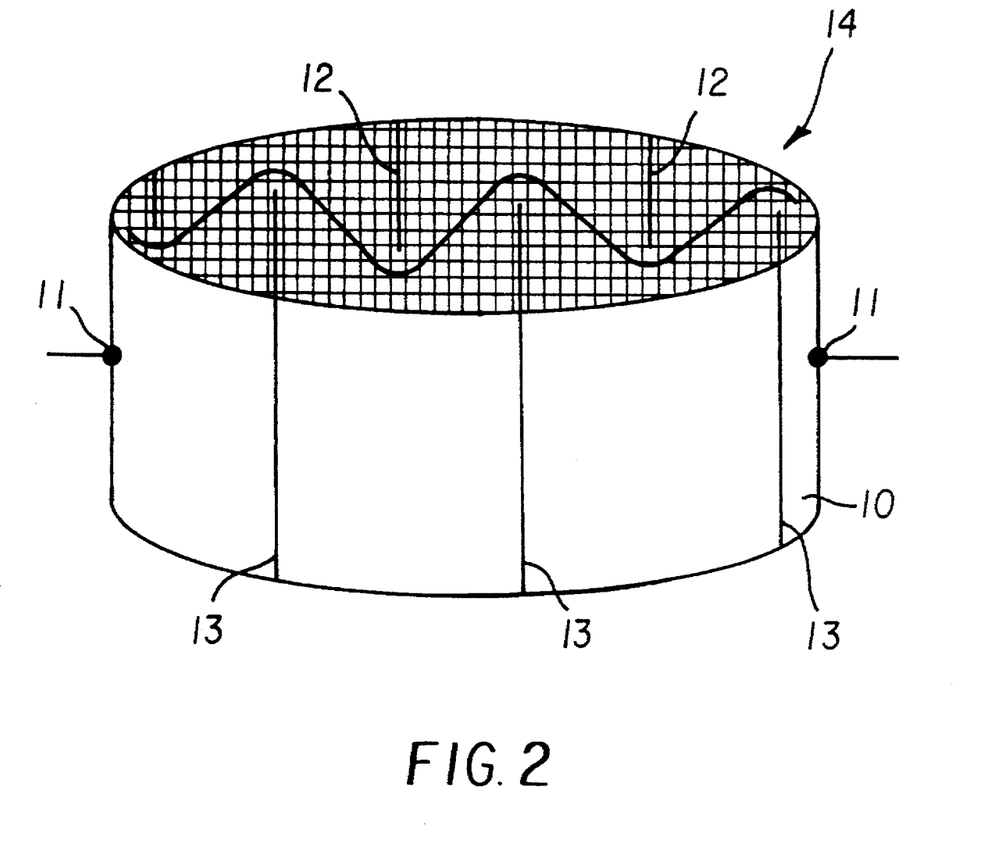
FIG. 2 shows a honeycomb heater.

As shown in FIG. 2, each honeycomb structure was provided, on the side wall 10, with two electrodes 11. As also shown in FIG. 2, six slits 12 each having a length of 70 mm (the two outermost slits each had a length of 50 mm) were formed in each honeycomb structure so that they were parallel to the passage axial direction and the number of cells between the two adjacent slits became 7 (about 10 mm). Further, the circumferential portion 13 of each slit 12 was filled with an inorganic adhesive made of heat-resistant $ZrO_2$, to form an insulation portion. Thus, honeycomb heaters 14 were produced.

[Preparation of catalyst-loaded honeycomb heaters]

A catalyst layer having the same composition and structure as in Example 5 or 9 was formed on the above-prepared honeycomb heater to obtain catalyst-loaded honeycomb heaters of Examples 12 and 13, respectively. Also, a catalyst layer having the same composition and structure as in Comparative Example 3 or 4 was formed on the above-prepared honeycomb heater to obtain catalyst-loaded honeycomb heaters of Comparative Examples 5 and 6, respectively.

[Evaluation of catalyst-loaded honeycomb heaters]

Each of the catalyst-loaded honeycomb heaters obtained above was placed just before a commercially available three-way catalyst (volume =0.6 liter; outside diameter =3.66 inches; rib thickness =6 mil; cell density =400 $cpi^2$; Pt/Rh loaded on a cordierite carrier), and aged in the same manner as mentioned previously. The resulting catalyst-loaded honeycomb heater was mounted in a car with an in-line four-cylinder engine of 2,000 cc displacement, and subjected to the FTP test. In this test, the catalyst-loaded honeycomb heater was mounted at a manifold position which was 350 mm distant from the engine exhaust port. Also at a position 1,200 mm distant from the engine exhaust port, there was mounted a 1.3-liter commercially available three-way catalyst which had been aged in the same manner as mentioned previously but at an exhaust gas temperature of 750° C. The heater was electrified by an electric current of 2 kw for 30 seconds after the engine start. Secondary air was introduced at a position 100 mm before the heater at a rate of 160 liters/min for 100 seconds after the engine start to maintain an atmosphere of λ=1.0 to 1.3. The results of the FTP test are shown in Table 5.

TABLE 5

| | FTP total emission (g/mile) | | |
|---|---|---|---|
| | CO | HC | NOx |
| Example 12 | 1.50 | 0.072 | 0.25 |
| Example 13 | 1.54 | 0.073 | 0.27 |
| Comparative Example 5 | 1.70 | 0.096 | 0.35 |
| Comparative Example 6 | 1.94 | 0.105 | 0.30 |

As is clear from Table 5, the honeycomb heaters of Examples 12–13 on which the catalysts of the present invention are loaded, as compared with those of Comparative Examples 5–6, are superior in conversions of CO, HC and NOx which are all harmful components.

As stated above, the catalyst for purification of exhaust gases according to the present invention is superior in exhaust gas purification ability such as three-way purification ability and low-temperature light-off performance, as well as in durability. Further, in the present catalyst, noble metals, which are active components of the catalyst, are utilized very effectively.

What is claimed is:

1. A catalyst for purification of exhaust gases, comprising a carrier and a catalyst layer formed thereon for reduction of carbon monoxide, hydrocarbons and nitrogen oxides emitted from an internal combustion engine, the catalyst layer containing catalyst particles comprising particles of heat-resistant inorganic oxide and loaded thereon noble metals of Pt, Pd and Rh, wherein Rh and Pd do not coexist in any catalyst particle of the catalyst layer, and said catalyst particles include (i) Pd catalyst particles having 2–10% by weight Pd, based on the inorganic oxide, loaded on the particles of heat-resistant inorganic oxide, said Pd catalyst particles being provided in a section of the catalyst layer extending from an outer surface of the catalyst layer to a midpoint of the thickness of the catalyst layer, and (ii) exposed catalyst particles having at least Rh loaded on the particles of the heat-resistant inorganic oxide, at least said exposed catalyst particles being provided at an outer surface of the catalyst layer.

2. A catalyst for purification of exhaust gases according to claim 1, wherein Rh and Pt do not coexist in any catalyst particle of the catalyst layer.

3. A catalyst for purification of exhaust gases according to claim 1, wherein the heat-resistant inorganic oxide comprises active alumina.

4. A catalyst for purification of exhaust gases according to claim 1, wherein the heat-resistant inorganic oxide comprises zircornia.

5. A catalyst for purification of exhaust gases according to claim 1, wherein the heat-resistant inorganic oxide comprises active alumina and zirconia.

6. A catalyst for purification of exhaust gases according to claim 1, wherein a rare earth element oxide is added to the heat-resistant inorganic oxide.

7. A catalyst for purification of exhaust gases according to claim 1, wherein a compound oxide of rare earth element oxides is added to the heat-resistant inorganic oxide.

8. A catalyst for purification of exhaust gases according to claim 1, wherein a compound oxide of a rare earth element oxide and zirconia is added to the heat-resistant inorganic oxide.

9. A catalyst for purification of exhaust gases according to claim 1, wherein said exposed catalyst particles form an Rh surface coating layer consisting only of said exposed catalyst particles.

10. A catalyst for purification of exhaust gases according to claim 1, wherein said exposed catalyst particles are provided in an Rh—Pd surface coating layer comprising a mixture of said exposed catalyst particles and catalyst particles comprising Pd.

11. A catalyst for purification of exhaust gases according to claim 10, wherein in the catalyst particles comprising Pd of the Rh—Pd surface coating layer, the amount of Pd loaded is 2–10% by weight based on the heat-resistant inorganic oxide thereof.

12. A catalyst for purification of exhaust gases according to claim 1, wherein said Pd catalyst particles are provided in the form of a layer consisting only of said Pd catalyst particles.

13. A catalyst for purification of exhaust gases according to claim 1, wherein the catalyst layer has a thickness of not less than 30 μm or more.

14. A catalyst for purification of exhaust gases according to claim 1, wherein the amount of Rh loaded is 0.2–2.5% by weight based on the heat-resistant inorganic oxide.

15. A catalyst for purification of exhaust gases according to claim 1, wherein the amount of Pt loaded is 0.2–2.5% by weight based on the heat-resistant inorganic oxide.

16. A catalyst for purification of exhaust gases according to claim 1, wherein the carrier is monolithic, is comprised of a heat-resistant inorganic oxide and has a honeycomb structure.

17. A catalyst for purification of exhaust gases according to claim 1, wherein the carrier is monolithic, has a honeycomb structure, is provided with at least one electrode, and can generate heat when electrified.

* * * * *